(12) United States Patent  
Miyata

(10) Patent No.: US 7,562,900 B2  
(45) Date of Patent: Jul. 21, 2009

(54) AIRBAG APPARATUS AND MOTORCYCLE WITH AIRBAG APPARATUS

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 30 days.

(21) Appl. No.: 11/470,692

(22) Filed: Sep. 7, 2006

(65) Prior Publication Data

US 2007/0052213 A1     Mar. 8, 2007

(30) Foreign Application Priority Data

Sep. 7, 2005     (JP) .............................. 2005-259974

(51) Int. Cl.  
*B60R 21/16* (2006.01)

(52) U.S. Cl. ................................. 280/730.1

(58) Field of Classification Search ................ 280/219, 280/730.1, 743.1, 729; 180/219; *B60R 21/16*  
See application file for complete search history.

(56) References Cited

U.S. PATENT DOCUMENTS

| | | | |
|---|---|---|---|
| 3,642,303 A | | 2/1972 | Irish et al. |
| 5,577,765 A | * | 11/1996 | Takeda et al. ............... 280/729 |
| 5,967,545 A | * | 10/1999 | Iijima et al. .............. 280/730.1 |
| 6,007,090 A | * | 12/1999 | Hosono et al. ........... 280/730.2 |
| 6,786,505 B2 | * | 9/2004 | Yoshida ...................... 280/729 |
| 6,932,379 B2 | * | 8/2005 | Yamazaki et al. ......... 280/730.1 |
| 6,971,666 B2 | * | 12/2005 | Akiyama et al. ............ 280/729 |
| 7,048,299 B2 | * | 5/2006 | Iijima et al. .............. 280/730.1 |
| 7,264,270 B2 | * | 9/2007 | Miyata et al. ............ 280/743.2 |
| 7,275,762 B2 | * | 10/2007 | Miyata ..................... 280/743.2 |
| 2004/0007855 A1 | * | 1/2004 | Kurata et al. ................ 280/729 |
| 2004/0256848 A1 | * | 12/2004 | Miyata et al. ............ 280/743.2 |

FOREIGN PATENT DOCUMENTS

| | | |
|---|---|---|
| EP | 1 625 980 A2 | 2/2006 |
| JP | 10-71911 | 3/1998 |
| JP | 2002-137777 A | 5/2002 |
| WO | 03 101788 A1 | 12/2003 |

* cited by examiner

*Primary Examiner*—John Q. Nguyen  
*Assistant Examiner*—Robert A. Coker  
(74) *Attorney, Agent, or Firm*—Fitch, Even, Tabin & Flannery

(57) ABSTRACT

A technique is provided that is effective in increasing occupant retraining performance of an airbag apparatus to be mounted to a motorcycle in a vehicle accident while reducing the size of an airbag. In one form, an airbag of an airbag apparatus mounted to a motorcycle includes a first airbag portion that deploys into the region of the occupant restraining region around the lumbar part of a rider; a second airbag portion that deploys into the region of the occupant restraining region around the chest of the rider; and an interference preventing portion that prevents interference with the arms of the rider with the first airbag portion and the second airbag portion.

3 Claims, 8 Drawing Sheets

AIRBAG APPARATUS AND MOTORCYCLE WITH AIRBAG APPARATUS

FIELD OF THE INVENTION

The present invention relates to a technique of constructing an airbag apparatus to be mounted to a motorcycle.

BACKGROUND OF THE INVENTION

There have been various known techniques of restraining occupants of motorcycles with airbag apparatuses. One of the known techniques is such that, when a motorcycle collides head-on, an airbag housed in a casing mounted to the body frame is inflated by expansion gas to restrain an occupant (e.g., refer to Japanese Unexamined Patent Application Publication No. 2002-137777). This technique presents a possibility of ensuring a wide restraining area of the airbag, which however needs to increase the size of the airbag correspondingly. This type of airbag therefore requires a technique effective in reliably restraining an occupant with the airbag even with a compact airbag.

SUMMARY OF THE INVENTION

The present invention is made in view of the above problem. Accordingly, it is an object of the invention to provide a technique of increasing occupant restraining performance of an airbag apparatus to be mounted to a motorcycle in a vehicle accident while reducing the size of an airbag.

In order to achieve the above object, the invention described hereinafter is provided. Typically, the invention can be applied in constructing airbag apparatuses to be mounted to various motorcycles. In this specification, a motorcycle, a typical example of vehicles, includes various saddle-type vehicles that an occupant straddles, such as touring motorcycles having a fuel tank in front of an occupant seat and motor scooters having a space between an occupant seat and a handlebar-supporting head pipe. In addition to the motorcycles, the "motorcycle" includes vehicles that occupants straddle and having three or more running wheels (e.g., three-wheel motorbikes for use in home delivery service and three- or four-wheel buggies for bad roads) and vehicles that occupants ride on and running by sledges or caterpillars, such as snow mobiles.

A first form of the present invention for solving the above-described problem is an airbag apparatus as described below. The airbag apparatus includes at least an airbag. The airbag deploys to restrain an occupant when expansion gas is fed into the interior by an expansion gas feeding device such as an inflator during a frontal collision of a vehicle. Particularly, the airbag of the invention includes at least a first airbag portion, a second airbag portion, and an interference preventing portion. The invention may be such that the first airbag portion and the second airbag portion are combined into a single airbag, or alternatively, the first airbag portion and the second airbag portion are formed into separate airbags.

The first airbag portion of the airbag is constructed so as to deploy locally into the region of an occupant restraining region which corresponds to the lumbar part of the occupant. The first airbag portion deploys above the knees (legs) of a rider to restrain the lumbar part of the rider and to retain the thighs of the rider R from above during the deployment. Since the lumbar part of the rider substantially agrees with the center of gravity of the rider, the restraint of at least the lumbar part, that is one of regions effective in retraining the rider, can surely prevent the upward movement of the rider during a collision and also during pitching or the like. For the retaining of the thighs of the rider, the lower surface of the first airbag portion interferes with the regions corresponding to the thighs of the rider. This arrangement surely prevents the upward movement of the rider during a frontal collision of the vehicle with the first airbag portion that comes into contact with the upper surface of the thighs of the rider.

The second airbag portion of the airbag is constructed so as to deploy locally into the region of the occupant restraining region which corresponds to the chest of the rider. The second airbag portion has the function of restraining the chest of the rider during the deployment. Thus, the restraint of at least the chest, that is one of the regions effective in retraining the rider, can surely prevent the forward movement of the rider during a frontal collision. In the present invention, the first airbag portion and the second airbag portion of the deployed airbag are the local portions in the vertical direction of the vehicle body (the direction of the height of the occupant) in the occupant restraining region. Thus the airbag of the invention does not deploy across the occupant restraining region in a frontal collision, but deploys convergently into a desired local vertical region of the vehicle body.

The interference preventing portion of the airbag is constructed as a portion preventing the interference of the first airbag portion and the second piston portion with the arms of the rider. Here the arrangement for "preventing the interference with the arms by the interference preventing portion" includes a structure in which the interference preventing portion does not come into contact with the arms of the rider at all and a structure in which the interference preventing portion comes into contact with the arms of the rider with relatively small force (so as not to push up the arms strongly). In a word, the interference preventing portion of the present invention may have only to prevent the arms of the rider from being pushed up strongly by the deployed airbag. This arrangement can prevent the original purpose of the airbag from being obstructed by the interference with rider's arms.

The interference preventing portion can be provided by devising the shape of the cutting of an airbag ground fabric, or alternatively, by stitching a tether or the like that interconnects the inner walls to the airbag.

In the invention, the time (timing) the prevention of the interference is achieved by the interference preventing portion may be directly after the occurrence of the frontal collision, or alternatively, during the succeeding action. This arrangement in which the interference between the airbag and the arms is prevented directly after the occurrence of the frontal collision can prevent the original restraining performance of the airbag from being obstructed by the interference with the arms of the rider. The original restraining performance is to restrain a rider who is moving ahead of the vehicle (also into a upper front region) by the first airbag portion and the second airbag portion in a frontal collision. Also, the arrangement in which the interference between the airbag and the arms is continuously prevented during the succeeding action directly after the occurrence of the frontal collision can maintain the original restraining performance by the first airbag portion and the second airbag portion during a series of the forward movement (also the movement into an upper front region) of the rider.

With the arrangement of the airbag apparatus according to the first form, there is no need to deploy the airbag widely across the occupant restraining region in front of the occupant. Accordingly, the airbag and the airbag apparatus that houses the airbag can be reduced in size. Also, since the interference between the first airbag portion and the second airbag portion and the arms of the occupant can be prevented by the interference preventing portion, occupant restraining performance during a vehicle accident can be increased with a compact airbag and airbag apparatus.

A second form of the present invention for solving the above-described problem is an airbag apparatus as described below. The airbag apparatus is such that the airbag of the first form is a single airbag in which the first airbag portion and the second airbag portion are integrated, and the interference preventing portion is formed between the first airbag portion and the second airbag portion. Typically, the boundary between the first airbag portion and the second airbag portion is recessed toward the center of the airbag so as to minimize the interference with the regions corresponding to the arms of the occupant.

Accordingly, with the arrangement of the airbag apparatus of the second form, occupant restraining performance can be increased with a compact airbag and airbag apparatus, and the structure of the airbag can be simplified.

A third form of the present invention for solving the above-described problem is a motorcycle with an airbag apparatus as described below. The motorcycle with an airbag apparatus is a motorcycle mounted with the airbag apparatus according to the first or second forms.

Accordingly, the invention of the third form provides a motorcycle in which occupant restraining performance in a vehicle accident can be increased with a compact airbag and airbag apparatus.

The airbag apparatus to be mounted to a motorcycle according to present invention is arranged in such a manner that only important regions of the body of an occupant are locally (convergently) restrained by the airbag and the interference between the airbag and the arms during the deployment of the airbag is prevented. This arrangement enables the occupant restraining performance in a vehicle accident to be increased while reducing the size of the airbag.

DETAILED DESCRIPTION OF THE PREFERRED EMBODIMENTS

Figure 1:
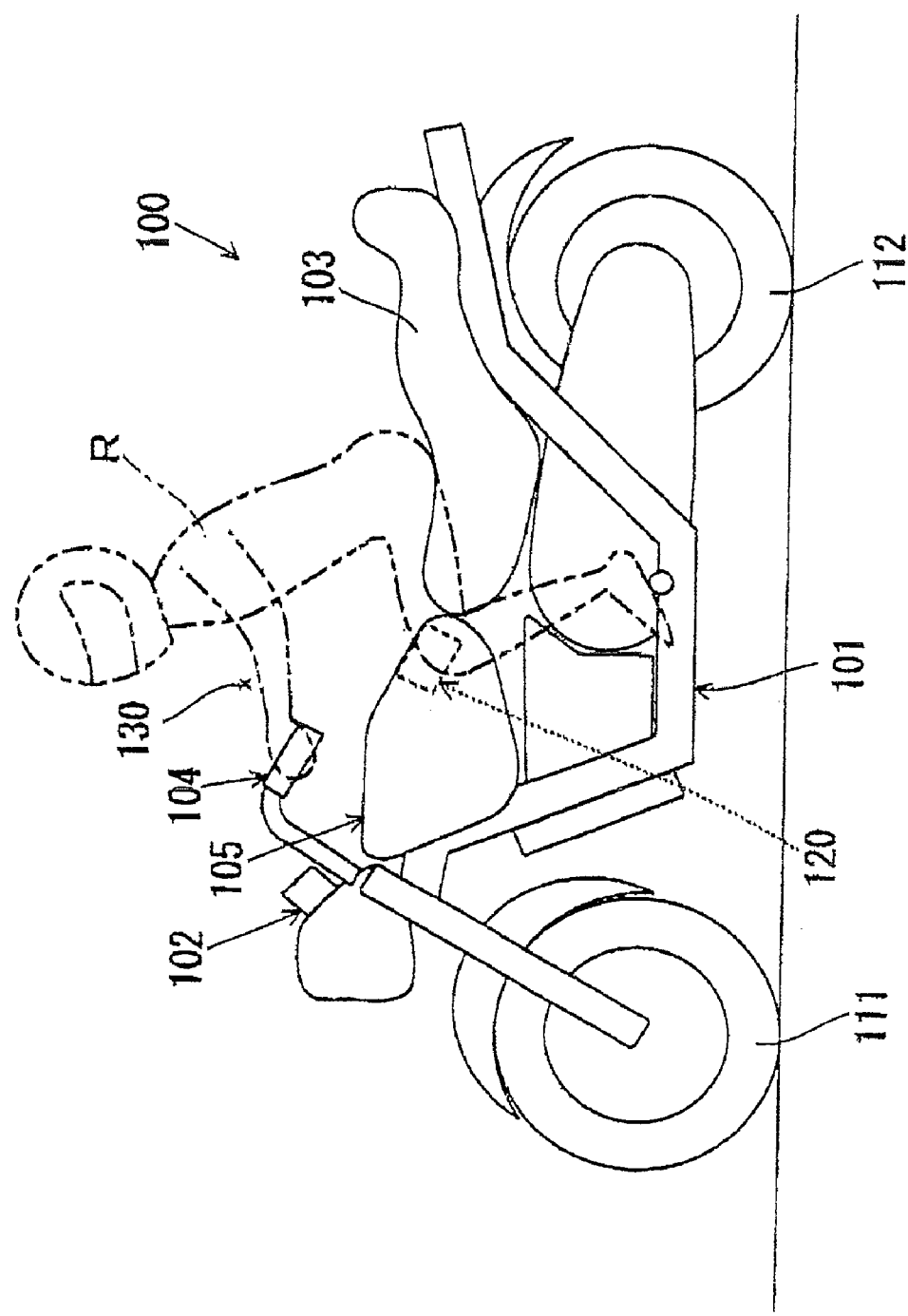
FIG. 1 is a side view of the motorcycle 100 according to an embodiment of the invention, showing a state in which an airbag apparatus 120 is mounted to the motorcycle 100.
Figure 2:
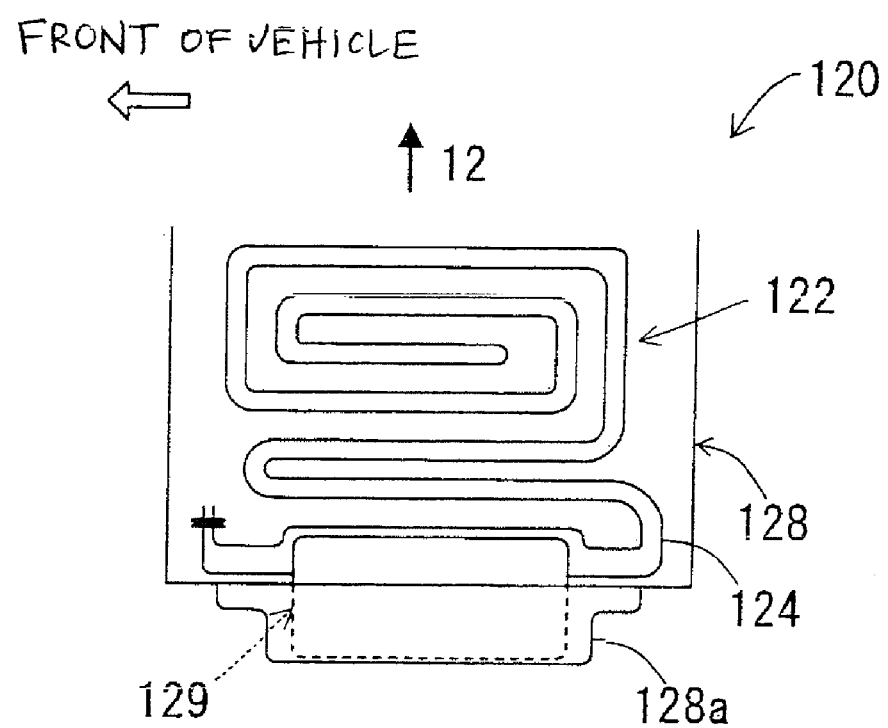
FIG. 2 shows the structure of the airbag apparatus 120 in FIG. 1.

An embodiment of the present invention will be described specifically with reference to the drawings. Referring first to FIGS. 1 and 2, the entire structure of a motorcycle 100 and the structure of an airbag apparatus 120 will be described. FIG. 1 is a side view of the motorcycle 100 according to an embodiment of the invention, showing a state in which the airbag apparatus 120 is mounted to the motorcycle 100. FIG. 2 shows the structure of the airbag apparatus 120 in FIG. 1. The motorcycle 100 of the embodiment is an example of "a vehicle" or "a motorcycle" of the invention.

Referring to FIG. 1, the motorcycle 100 is what is called a touring motorcycle and mainly comprises a body frame 101 including an engine and a main frame; a seat 103 that a rider R can straddle; handlebars 104; a front wheel 111; and a rear wheel 112.

A region above the body frame 101 of the motorcycle 100 and in front of the rider R is specified as an occupant restraining region 130 in the event of a frontal collision of the motorcycle 100. The "frontal collision" in the embodiment broadly includes that the motorcycle 100 collides with a front object (not shown for convenience sake). The "occupant restraining region 130" of the embodiment corresponds to "an occupant retraining region" of the invention, which is defined as a space extending in the direction of the forward movement of the rider R and for restraining the rider R who is flung ahead of the motorcycle 100 by a kinetic energy during a frontal collision.

A front portion 102 of the body frame 101, at the front of the vehicle, includes a headlight, various meters, switches, and the like. The airbag apparatus 120 is disposed at the rear of a fuel tank 105 behind the front portion 102. Particularly, the airbag apparatus 120 of the embodiment is disposed so as to face the occupant restraining region 130 for the rider R. The airbag apparatus 120 of the embodiment corresponds to "an airbag apparatus" of the invention.

Referring to FIG. 2, the airbag apparatus 120 of FIG. 1 mainly includes a retainer 128 serving as an airbag housing; an airbag 122 housed in the retainer 128 in a predetermined folded condition; and an inflator 129 housed in an inflator housing 128a of the retainer 128 and feeding expansion gas into the airbag 122 so that the airbag 122 deploys from the retainer 128. The airbag 122 corresponds to "an airbag" of the invention. In FIG. 2, the direction of the expansion (deployment) of the airbag 122 is indicated by an arrow 12.

Figure 3:
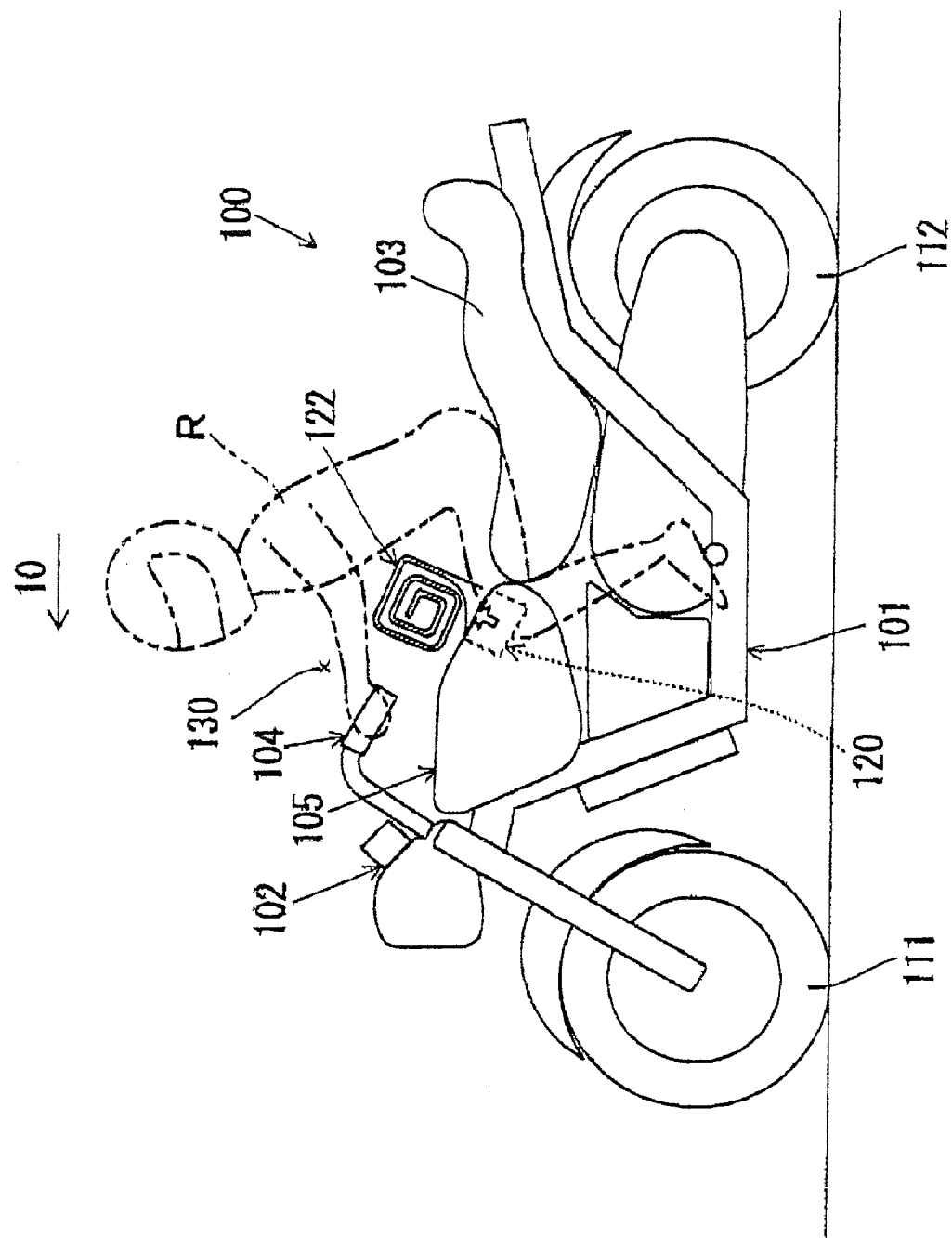
FIG. 3 is a diagram showing a state in which an airbag 122 starts to inflate, as viewed from the side of the vehicle.
Figure 4:
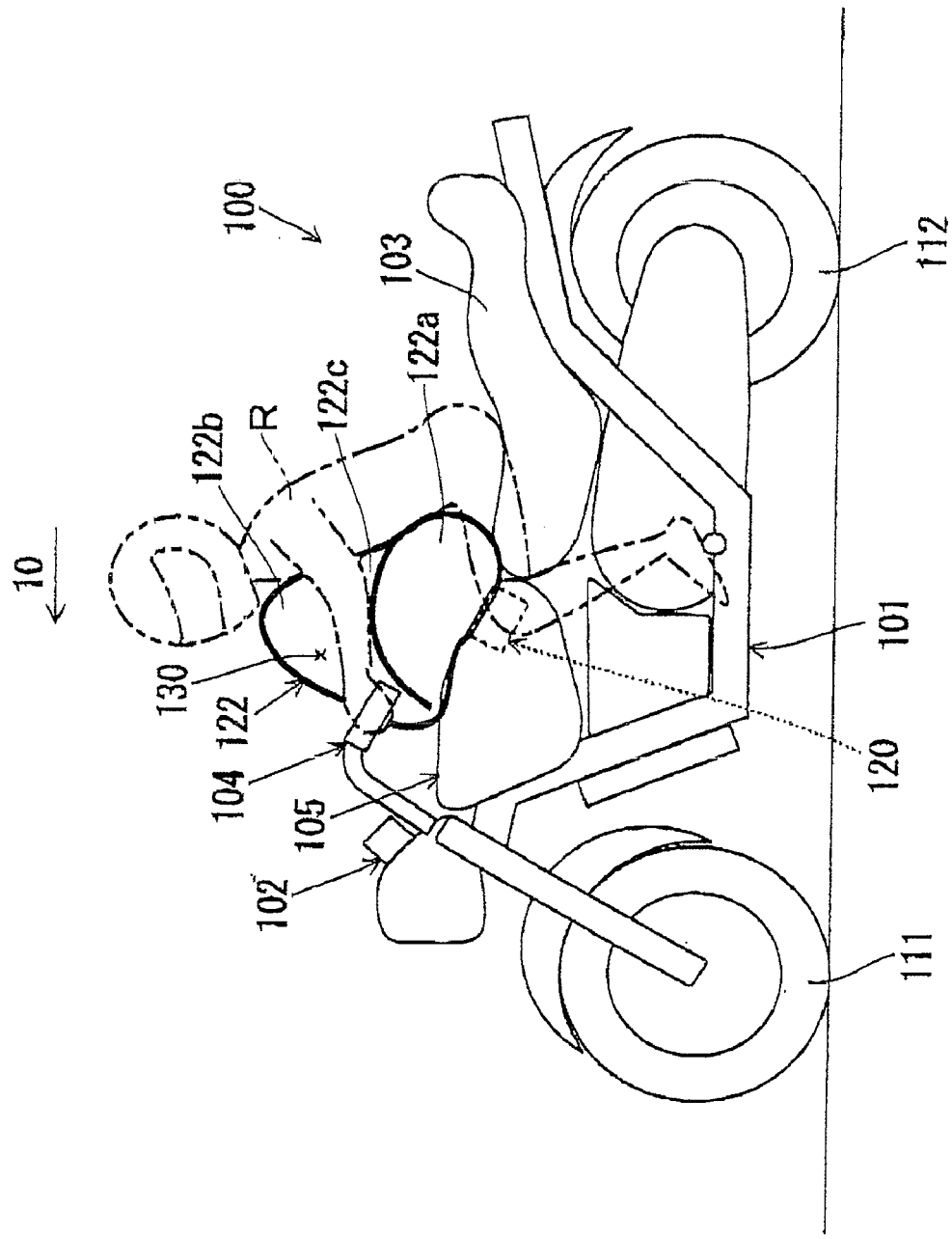
FIG. 4 is a diagram showing a state in which the airbag 122 has completed the inflation, as viewed from the side of the vehicle.
Figure 5:
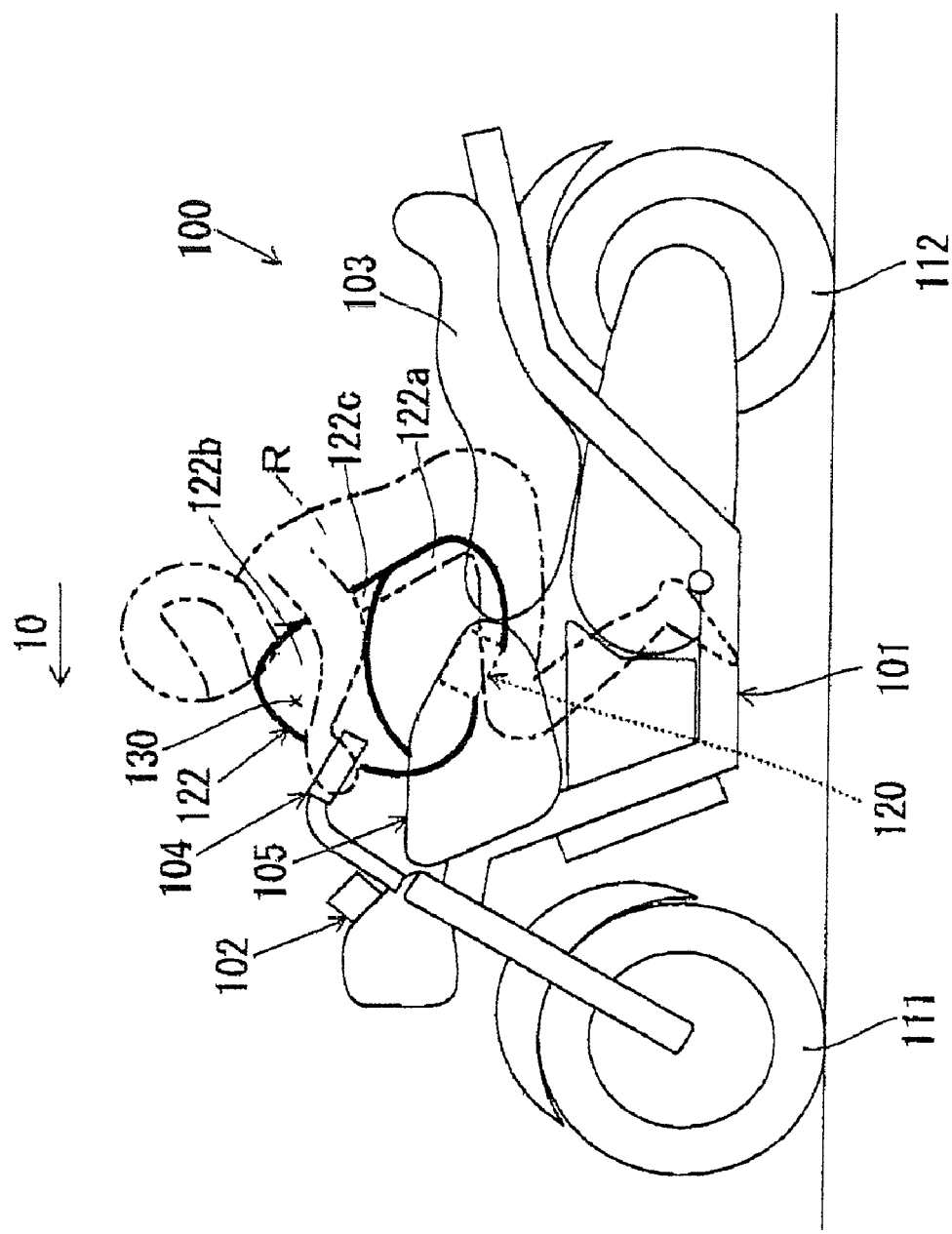
FIG. 5 is a diagram showing a state in which the inflated airbag 122 restrains a rider R, as viewed from the side of the vehicle.
Figure 6:
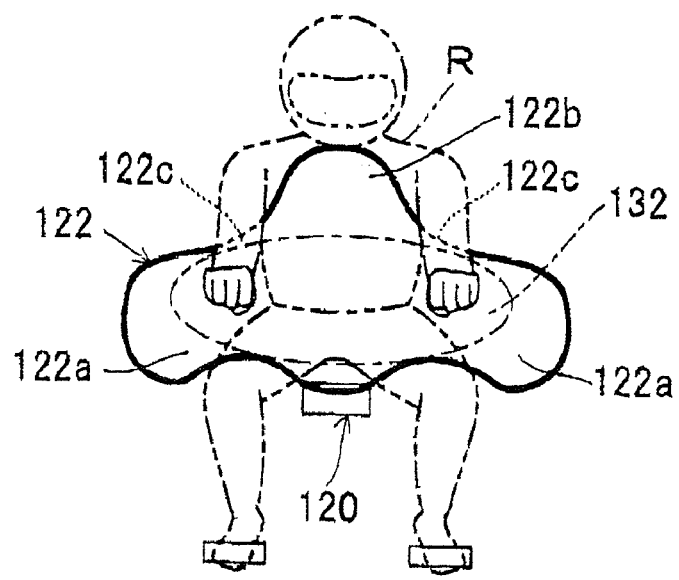
FIG. 6 is a diagram showing a state in which the inflated airbag 122 restrains the rider R, as viewed from the front of the vehicle.
Figure 7:
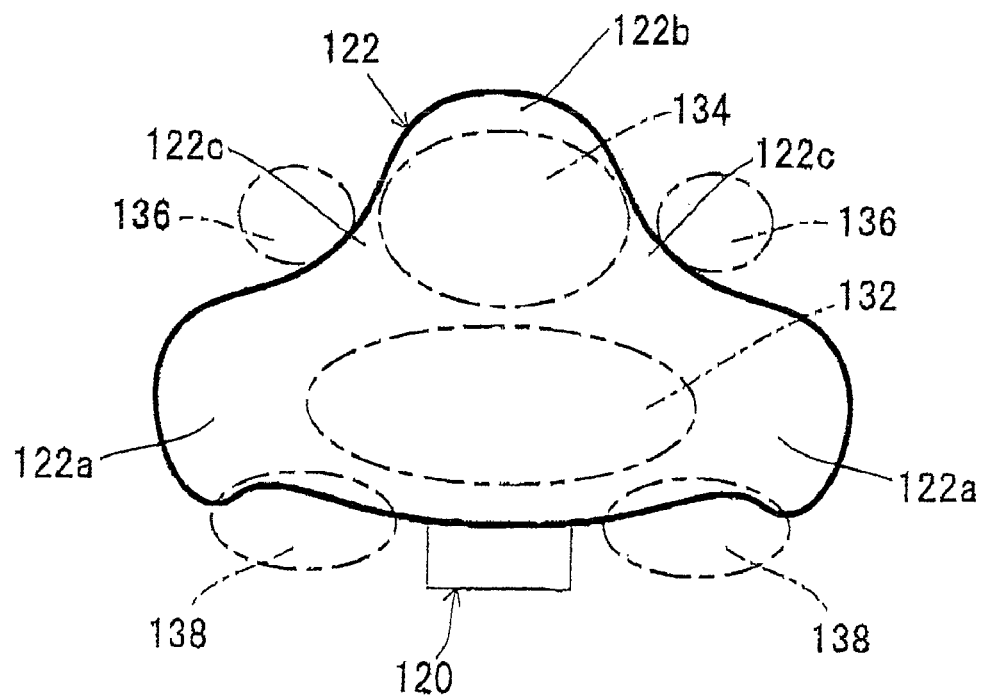
FIG. 7 is an enlarged view of the airbag 122 shown in FIG. 6.
Figure 8:
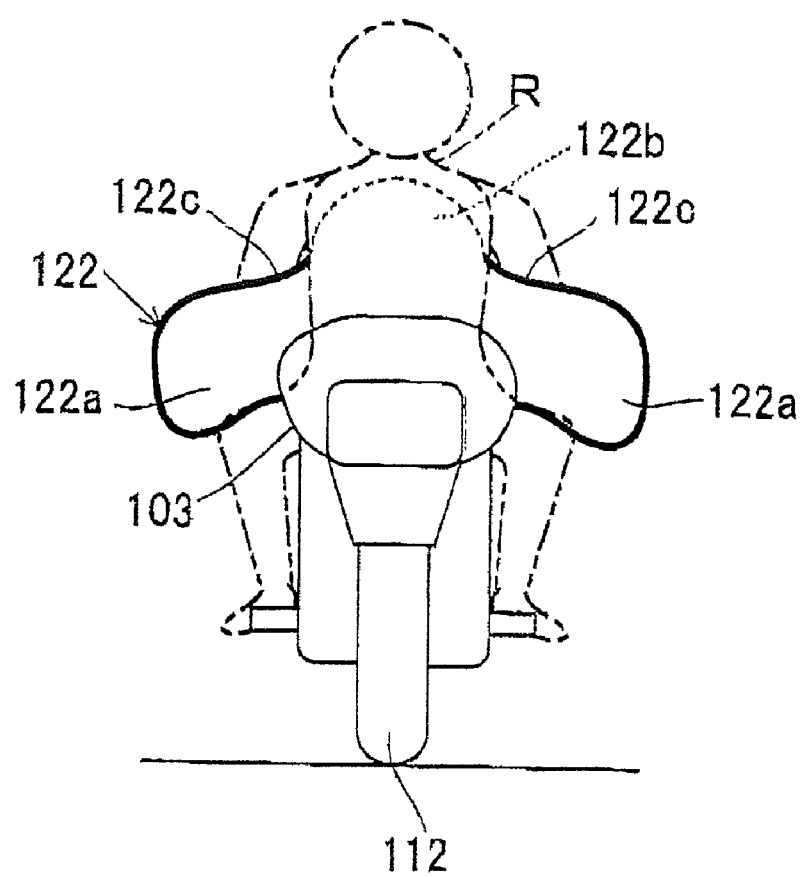
FIG. 8 is a diagram showing a state in which the inflated airbag 122 restrains the rider R, as viewed from the back of the vehicle.
Figure 9:
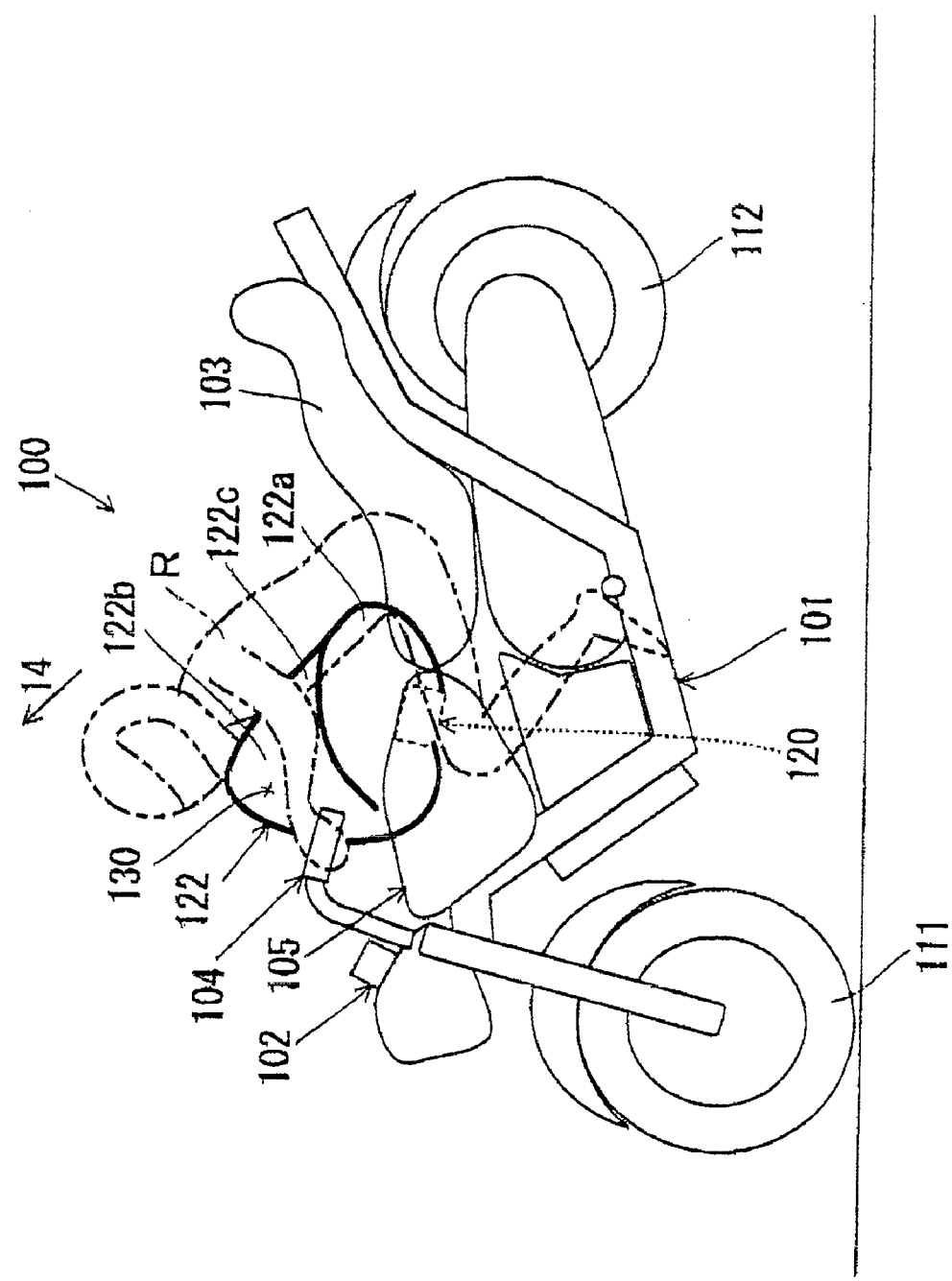
FIG. 9 is a diagram showing a state in which the rider is restrained during pitching, as viewed from the side of the vehicle.

The operation of the airbag apparatus 120 with this arrangement will be described with reference to FIGS. 3 to 9. FIG. 3 is a diagram showing a state in which the airbag 122 starts to deploy, as viewed from the side of the vehicle. FIG. 4 is a diagram showing a state in which the airbag 122 has completed the inflation, as viewed from the side of the vehicle. FIG. 5 is a diagram showing a state in which the inflated airbag 122 restrains the rider R, as viewed from the side of the vehicle. FIG. 6 is a diagram showing a state in which the inflated airbag 122 restrains the rider R, as viewed from the front of the vehicle. FIG. 7 is an enlarged view of the airbag 122 in FIG. 6. FIG. 8 is a diagram showing a state in which the inflated airbag 122 restrains the rider R, as viewed from the back of the vehicle. FIG. 9 is a diagram showing a state in which the rider is restrained during pitching, as viewed from the side of the vehicle.

Referring to FIG. 3, when the motorcycle 100 comes into a collision in the traveling direction, the rider R is moving (being flung) ahead of the motorcycle 100 (e.g., in the direction of an arrow 10 in FIG. 3). In the embodiment, upon detection of the frontal collision, the inflator 129 is activated to start the inflation (deployment) of the airbag 122 in a predetermined direction from the airbag apparatus 120. Since expansion gas is continuously fed into the airbag 122, the airbag 122 is expanded in sequence from the retainer 128.

Thus, as shown in FIG. 4, the airbag 122 is completely deployed. In this state, the expanded airbag 122 locally fills the vertical region (along the height of the occupant) of the occupant restraining region 130. As will be described later, the airbag 122 of the embodiment is not widely deployed across the occupant restraining region 130 but is deployed convergently to a desired local portion of the regions of the occupant's body.

When the motorcycle 100 collides head-on, and the rider R is moving forward by the kinetic energy of the collision, the inflated airbag 122 effectively restrains the rider R, who is moved into a forward-bent posture, from the front, side, and above, because the airbag 122 is disposed in the direction of the movement of the rider R, as shown in FIG. 5.

The specific operation of the airbag 122 will be described with reference to FIGS. 6 to 8.

As shown in FIGS. 6 to 8, the airbag 122 of the embodiment is constructed as a single airbag in which at least a first airbag portion 122a, a second airbag portion 122b, and an interference preventing portion 122c are combined into one. Particularly, the airbag 122 is constructed so as to come into the shape shown in FIG. 7 when deployed, as viewed from the front of the vehicle. The construction may be achieved by devising the shape of the cutting of an airbag ground fabric, or alternatively, by stitching a tether or the like that connects the inner walls together into the airbag 122.

As shown in FIG. 7, the first airbag portion 122a of the airbag 122 is constructed as a portion which deploys locally around the lumbar part of the rider R (a region 132 in FIG. 7) in the occupant restraining region 130 in front of the rider R. The first airbag portion 122a corresponds to "a first airbag portion" of the invention. The first airbag portion 122a has the function of deploying above the knees (legs) of the rider R to restrain the lumbar part of the rider R during the deployment and to retain the thighs of the rider R from above. Since the lumbar part of the rider R substantially agrees with the center of gravity of the rider R, the restraint of at least the lumbar part, that is one of regions effective in retraining the rider R, can ensure the prevention of the upward movement of the rider R during a collision and also during pitching or the like. For the retaining of the thighs of the rider R, two portions on the lower surface of the first airbag portion 122a interfere with the regions corresponding to the thighs of the rider R (regions 138 and 138 in FIG. 7). This arrangement can ensure the prevention of the upward movement of the rider R during the frontal collision of the vehicle.

The second airbag portion 122b of the airbag 122 is constructed as a portion which deploys locally around the chest of the rider R (a region 134 in FIG. 7) in the occupant restraining region 130 in front of the rider R. The second airbag portion 122b corresponds to "a second airbag portion" of the invention. The second airbag portion 122b has the function of restraining the chest of the rider R during the deployment. Thus, the restraint of at least the chest, that is one of the regions effective in retraining the rider R, can ensure the prevention of the forward movement of the rider R during a frontal collision.

The interference preventing portion 122c of the airbag 122 has the function of preventing interference with the arms of the rider R at the boundary between the first airbag portion 122a and the second airbag portion 122b. Specifically, the interference preventing portion 122c has a structure in which two portions at the boundary between the first airbag portion 122a and the second airbag portion 122b are recessed toward the center of the airbag 122 so as to minimize the interference with the regions corresponding to the arms of the rider R (regions 136 and 136 in FIG. 7). The interference preventing portion 122c corresponds to "an interference preventing portion" of the invention. Here the function of preventing interference with the arms by the interference preventing portion 122c includes a structure in which the interference preventing portion 122c does not come into contact with the arms of the rider R at all and a structure in which the interference preventing portion 122c comes into contact with the arms of the rider R with relatively small force (so as not to push up the arms strongly). In a word, the interference preventing portion 122c has only to prevent the arms of the rider R from being pushed up strongly by the deployed airbag 122 in the embodiment.

According to the embodiment, the interference of the first airbag portion 122a and the second airbag portion 122b with the arms of the rider R can be prevented by the interference preventing portion 122c directly after the occurrence of a frontal collision of the vehicle. Due to this arrangement of the interference preventing portion 122c, the original purpose of the airbag 122, that is the restraint of the rider R who is moving ahead of the vehicle (also in an upper front direction) by the first airbag portion 122a and the second airbag portion 122b in a frontal collision, can be prevented from being obstructed by the interference with the arms of the rider R.

The motorcycle 100 may pitch by the energy of the motorcycle 100 in a frontal collision. In this case, the rider R can be kept under restraint by the inflated airbag 122, as shown in FIG. 9. Particularly, the first airbag portion 122a of the airbag 122 retains from above the thighs of the rider R who is moving upward in the direction of an arrow 14. Accordingly, the thighs are caught by the inflated airbag 122. Thus the airbag 122 effectively and surely restrains the rider R from above when the vehicle pitches.

According to the embodiment, the interference of the first airbag portion 122a and the second airbag portion 122b with the arms of the rider R can be continuously prevented by the interference preventing portion 122c directly after the occurrence of the frontal collision and the succeeding pitching. The arrangement of the interference preventing portion 122c can also maintain the original purpose of the airbag 122, that is the restraint of the rider R by the first airbag portion 122a and the second airbag portion 122b during a series of the forward movement (including a movement in an upper front direction) of the rider R directly after the vehicle collision.

As described above, the embodiment can increase the occupant retaining performance during an accident not by widely deploying the airbag 122 across the occupant restraining region 130 in front of the rider R but by devising the shape and arrangement of the airbag 122 of the airbag apparatus 120. In other words, the embodiment is based on a strategical technical principle that only important regions of the body of the rider R are locally (intensively) restrained by the airbag 122. Also, the embodiment is constructed so as to minimize the interference between the airbag 122 and the arms of the rider R during deployment. With this arrangement, the airbag 122 and the airbag apparatus 120 can be reduced in size, and in addition, high occupant restraining performance can be maintained even with the compact airbag 122 in the same way as the case in which an airbag is widely deployed across the occupant restraining region 130.

Particularly, the airbag 122 of the embodiment is adapted such that the first airbag portion 122a restrains at least the lumbar part that is one of the important regions effective in restraining the rider; the second airbag portion 122b restrains at least the chest that is one of the important regions effective in restraining the rider; and the interference preventing portion 122c prevents the arms of the rider R from being pushed up strongly in the frontal collision. This arrangement enables the rider R to be restrained directly after the occurrence of the frontal collision to the succeeding pitching, thus increasing the retaining performance for the rider R.

According to the embodiment, the airbag 122 is deployed locally. This arrangement is effective in reducing the size of the airbag 122, the retainer 128 for housing the airbag 122 and so on in comparison with a structure in which an airbag is widely deployed across the occupant restraining region 130. The airbag 122, for example, may be locally deployed in a region corresponding to the shoulders of the rider R. This arrangement, however, has a limitation in reducing the size of the airbag because the airbag must be deployed widely. In contrast, the embodiment has a structure in which the airbag 122 is deployed toward a region close to the mounted position of the airbag apparatus 120. This arrangement can reduce the size of the airbag 122, the retainer 128 and so on, while maintaining the occupant restraining performance.

It is to be understood that the invention is not limited to the above-described embodiment but various applications and modifications may be made. For example, the following applications are possible.

While the embodiment is such that the deployed airbag 122 restrains the vicinity of the lumbar part, chest, and legs of the rider R from the front, side, and above, the invention may be constructed in such a manner that the airbag 122 rounds to the back of the lumbar part of the rider R to restrain the rider.

While the embodiment has been described with reference to the touring motorcycle 100 of what is called a touring type, the invention may be applied to other types of motorcycle such as motor scooters having a space between the handlebars and the seat and to vehicles other than the motorcycle 100.

While the embodiment has been described about the case in which the airbag apparatus 120 (the retainer 128) is disposed at the rear of the fuel tank 105, the position of the airbag apparatus 120 (the retainer 128) may be varied as appropriate provided that the airbag 122 deploys into a desired region in a vehicle collision. For example, the airbag apparatus 120 may be disposed more to the front than that shown in FIG. 1.

Motor scooters may have the airbag apparatus 120 (the retainer 128) under the seat or at the front of the vehicle body.

While the embodiment has been described about the case in which the single airbag 122 in which the first airbag portion 122a and the second airbag portion 122b are combined is used, the invention may have separate airbags having the function of the first airbag portion 122a and the function of the second airbag portion 122b, respectively. Alternatively, the invention may adopt a structure in which the single airbag 122 is combined with another airbag.

What is claimed is:

1. A motorcycle comprising:
   a motorcycle body;
   a seat of the motorcycle body for a rider;
   handlebars of the motorcycle body forward of the seat;
   an airbag retainer mounted to the motorcycle body;
   an airbag for being deployed from the retainer during emergency conditions;
   a lower portion of the airbag that upon inflation extends in a lateral direction beyond either side of the motorcycle body for being disposed above knees of the rider; and
   an upper portion of the airbag that upon inflation is narrower in the lateral direction than the lower portion and extends upwardly and centrally relative to the lower portion for being disposed adjacent a chest region of the rider;
   wherein the airbag includes intermediate side portions between the upper and lower portions that extend laterally inward toward the upper portion for being disposed under arms of the rider so that the rider's arms generally do not interfere with the inflation of the airbag's lower and upper portion, and the intermediate side portions extend arcuately in a fore and aft direction alongside the motorcycle body with an upward bow.

2. The motorcycle of claim 1 wherein the airbag generally has an inverted T configuration.

3. The motorcycle of claim 1 wherein the airbag comprises a single airbag.

* * * * *